United States Patent [19]
Cho

[11] Patent Number: 5,461,625
[45] Date of Patent: Oct. 24, 1995

[54] FRAME STRIPPING METHOD AND CIRCUIT IN FDDI (FIBER DISTRIBUTED DATA INTERFACE) BRIDGE SYSTEM

[75] Inventor: Tae K. Cho, Seoul, Rep. of Korea

[73] Assignee: GoldStar Information & Communication, Ltd., Seoul, Rep. of Korea

[21] Appl. No.: 112,788

[22] Filed: Aug. 26, 1993

[30] Foreign Application Priority Data

Aug. 31, 1992 [KR] Rep. of Korea ............... 92-15740
Jun. 22, 1993 [KR] Rep. of Korea ............... 93-11390

[51] Int. Cl.$^6$ ................................................. H04J 3/02
[52] U.S. Cl. ........................................ 370/85.5; 370/85.13
[58] Field of Search ........................... 370/85.5, 85.4, 370/94.1, 85.13, 85.12, 85.14, 85.15, 85.1; 395/200; 340/825.05

[56] References Cited

U.S. PATENT DOCUMENTS

| | | | |
|---|---|---|---|
| 5,142,530 | 8/1992 | Geyer et al. | 370/85.5 |
| 5,224,096 | 6/1993 | Onishi et al. | 370/85.5 |
| 5,331,636 | 7/1994 | Yang et al. | 370/85.5 |

Primary Examiner—Douglas W. Olms
Assistant Examiner—Dang Ton
Attorney, Agent, or Firm—Harrison & Egbert

[57] ABSTRACT

A frame stripping method and circuit for judging whether or not of source address matching by comparing the source address of the frame returing after registering the source addresses to CAM chip upon transmitting the frame in FDDI bridge system and transmitting a token with the source addresses within an already registered CAM chip comprise a CAM controller, a CAM sequencer, a plurality of CAM chips, a X bus latch, a CAM data bus generator and a match generator, so that it executes an effective frame stripping and schemes a stabilization of the system operation.

1 Claim, 8 Drawing Sheets

FRAME STRIPPING METHOD AND CIRCUIT IN FDDI (FIBER DISTRIBUTED DATA INTERFACE) BRIDGE SYSTEM

BACKGROUND OF THE INVENTION

The present invention relates to a method and circuit for stripping frames from FDDI ring when a frame transmitted to FDDI ring goes round the FDDI ring and thereafter returns to FDDI bridge system transmitted this frames in the FDDI bridge system, and more particularly to an article made to be suitable for a FDDI bridge system using FORMAC+ Am79C830 chip of AMD (Advanced Micro Devices) company for the FDDI ring media access control.

As it is widely known, the FDDI is a high speed network which has a Topology of double ring form, and makes a physical contact by using a fiber optic cable and executes 100 Mbps data rate transmission.

Media access control MAC protocol of FDDI is a timed token passing protocol TTPP.

Above-described TTPP is similar with a release after transmission RAT of token ring MAC protocol (IEEE 802.5) when excluding a point that said TTPP has a limitation of time between tokens received to a certain node.

All of stations connected to the FDDI ring can transmit the frame only in case which captured the token being going round the FDDI ring and enables the frame transmission of other station by transmitting the token on the FDDI ring after completing the frame transmission.

That is, during a station captured the token transmits a frame to the FDDI ring, the other station is in frame receiving state, and the frame transmission is possible by only a station captured a token transmitted by a station finished the frame transmission.

And, the station transmitted the frame has to strip an already transmitted frame returning after having gone round the FDDI ring from the FDDI ring.

FIG. 1 shows a form of data frame of FDDI protocol of general FDDI.

Here, a preamble PA is used for synchronization of the frame with clock of each station and which consists of idles more than sixteen.

And, a starting delimiter SD represents a start of the frame, and a frame control FC represents kinds of the frames, and a destination address DA represents an address of the station wanting the frame to be reached.

And, a source address SA represents an address of the station transmitting the frame, and an information INFO is a data region, and a frame check sequence FCS is a cyclic redundancy check CRC region of 32 bits, and an ending delimiter ED represents an end of the frame excluding a frame status FS region, and the frame status FS represents a frame status after a going round the FDDI ring.

The frame transmitted to the FDDI ring has to be stripped at a station transmitted the frame, and this process is called as a frame stripping, and concretely it is as shown in FIG. 2.

The frame is returned in a NRZI signaling form from a primary in of FDDI and converted in NRZ form through ENDEC: 2-1 and transmitted to FORMAC+ : 2—2.

The FORMAC+ (2—2) transmits again this frame to the ENDEC (2-1) and the ENDEC (2-1) converts this again to the NRZI form and transmits to a primary out.

At this moment, when the frame during repeating at present is judged as it a frame already transmitted to my station, this informed to the FORMAC+.

Specifically, a low signal applied to an input pin of an external source address match XSAMAT* which is an external address match signal of the FORMAC+.

When a low signal is inputted to the XSAMAT* pin, the FORMAC+ transmits again to the FDDI ring by inserting an idle symbol to an INFO region of the frame during re-transmitting at present.

This operation is called as a frame stripping.

A frame contained with an idle symbol to the INFO region is called as a fragmentary frame and this is ignored without treating as a normal frame at other station.

And, this fragmentary frame enters the primary in of said station during other station catches a token and thereafter transmits the frame to the FDDI ring, and this is automatically stripped by the FORMAC+.

That is, the frame inputted to a station being in transmitting the frame is automatically stripped by the FORMAC+ without being transmitted again to the FDDI ring.

When showing a frame stripping process entering the frame transmitting process, it will be as FIG. 3.

A method for strpping a frame transmitted to the FDDI ring in a conventional FDDI bridge system using an Am79C830 chip (FORMAC+) of AMD company as a FDDI MAC controller is as follows and its block diagram is as FIG. 4.

The Am79C830 chip includes a receive status pins RS4-0 representing a token coming from the FDDI ring and a receive status of the frame, a transmit status pins XS2-0 representing a token transmitted to the FDDI ring and a transmit status of the frame, a transmit bus X7-0 for transmitting the data to a physical layer device {corresponds to the ENDEC (2-1) of FIG. 2}, and a clock CLK for a synchronization of the FORMAC+ chip operation.

A frame stripping method will be explained by a block diagram of conventional frame stripping circuit shown in FIG. 4.

When the FDDI ring catches a token, the FORMAC+ indicates a token captured state to the receive status pins RS4-0.

When the token captured state is appeared, a control PAL 4-2 becomes to an operation preparing state and the station transmits a frame, and when the frame transmission is finished, a void frame is transmitted at last and a token is transmitted.

A frame transmit status is indicated at the transmit status pins of the FORMAC+ at a time when the station transmits a frame, and in this case, the control PAL 4-2 generates a up signal and increases a coefficient value of a counter 4-3 by 1.

When an already transmitted frame goes round the FDDI ring and returns to the station, a frame receive status is appeared to the receive status pins, and at this time, the control PAL 4-2 generates a down signal and decreases the coefficient value of the counter 4-3 by 1 and generates a generator control signal GCS.

The generator PAL 4—4 generates an external source address match signal XSAMAT+ by synchronizing to a clock synchronization signal when receiving the generator control signal GCS.

This XSAMAT* signal is inputted to the FORMAC+ and the FORMAC+ continues a frame transmission when a present station is in a frame transmitting, that is, the frame is automatically stripped as FIG. 3, and when the FOR- MAC+ is in a frame transmitting, it is transmitted by containing an idle symbol to an information INFO region of the transmitted frame as FIG. 2.

A frame stripping as this is continued until a coefficient value of the counter becomes to zero 0 or an already transmitted void frame returns.

That is, when the coefficient value of the counter increased upon transmitting the frame at the station is decreased upon receiving the frame and its value becomes to zero, C0 signal is outputted from the counter and this signal is inputted to the control PAL to terminate a generation of a generation control signal so as to make the generator PAL 4—4 not to be able to output any more the external source address match signal whereby the frame stripping is ended.

That is, the control PAL 4-2 stops the operation until a new token is caught from the FDDI ring and then waits.

And, even if the counter coefficient value is not 0, when an already transmitted void frame is returned, this is appeared to the transmit bus X7-0, at this moment, a void frame detect circuit 4-1 senses this and outputs a void frame detect signal VFDS to the control PAL 4-2, and the control PAL 4-2 outputs the GCS signal to the generator PAL 4—4 and strips the void frame during re-transmitting and then waits until the token is captured.

As described above, the conventional frame stripping method is that two kinds of frame counting method and void frame detecting method are used by mixing whereby the frame stripping is ended if one of them is satisfied.

However, in said conventional technique, since the receive status pins and the transmit status pins of the FORMAC+ are asynchronously operated each other (that is, an already transmitted frame can also be received even during a station transmits the frame), there may be a worry of occurring an error operation of the up/down counter which is capable of doing only one operation at one moment, and since a void frame detecting circuit added for supplementing and completing this should be added and provided, it has had a problem of increasing a product cost or increasing of complexity of the circuit.

OBJECT AND SUMMARY OF THE INVENTION

Therefore, it is a major object of the present invention to provide a frame stripping method and circuit in which a stripping of self frame existing in the FDDI ring can be smoothly executed without any participation of a microprocessor, and a source address of the transmitted frame is registered only regardless of the receive status during self station transmits the frame, so that not only an error operation is prevented but also a designing of the system is more easily done.

The frame stripping method of the present invention for attaining this object, in a FDDI bridge system using a FORMAC+ chip of ADM company as a FDDI MAC controller, comprises: a step for registering to a CAM chip by drawing out a source address of the frame appearing to the transmit bus of FORMAC+ upon transmitting the frame by utilizing an output signal of transmit status pins and receive status pins of FORMAC+ in order that an originating station strips the frame transmitted to the FDDI ring, from the FDDI ring; a step for comparing with source addresses registered to the CAM chip upon transmitting the frame by drawing the source address from the transmit bus of the FORMAC+ as same as a time transmitting the frame coming from the FDDI ring after the originating station transmits a token in this registering step; and a step for stripping a frame that the FORMAC+ is in re-transmitting at present by sending an external source address match signal XSAMAT* to the FORMAC+.

And, a frame stripping apparatus realizing aforementioned frame stripping method comprises: a CAM controller 6-1 for resetting a system operation by synchronizing to an operation clock signal CLX1 of the FORMAC+ and controlling entire operation; a CAM sequencer 6-2 for generating a chip selecting signal of a plurality of the CAM chips 6-3 connected to a rear end; a plurality of CAM chips 6-3 which consists of a plurality of CAM chips and inputted with an output WR* (an output CS4*-0* of D/C* and CAM sequence 6-2 and an output CD15-0 of CAM data bus generator 6-5) of said CAM controller 6-1 and stores an source address of the frame transmitted from the FDDI bridge system to a memory within the CAM chip, and compares the source address of the inputted frame with a source address within the already stored memory upon transmitting the frame, and when a matched source address is present, outputs an output signal(MAT4*-0*) to a match generator 6—6 with at least more than one low signal; X bus latch 6-4 for latching a source address of the frame from the transmit bus of the FORMAC+; a CAM data bus generator 6-5 for controlling the data bus of said CAM chip 6-3; and a match generator 6—6 for generating an external source address match signal XSAMAT* to the FORMAC+ and thereby makes the re-transmitting frame to be stripped.

DETAILED DESCRIPTION OF THE PREFERRED EMBODIMENTS

Hereinafter, a preferred embodiment of the present invention will be described in more detail with reference to the accompanying drawings.

In the present invention, as construction of the embodiment, source addresses of total 1280 can be stored by using five Am99C10 chip (Content Addressable Memory), and concrete explanation for this is as follows.

In case where an already transmitted frame has gone round the FDDI ring and comes back at a time when a certain station has captured a token and thereafter being transmitting the data frame, the FORMAC+ is not re-transmitted and automatically stripped.

Accordingly, in a frame stripping method by a source address registration, the numbers of source addresses to be stored to a memory is satisfied if computing the numbers of the frames that oneself has already transmitted which exists on the FDDIA ring at a time when a station finished the frame transmission and took out the token to the FDDI ring.

In the present invention, it is explained by assuming a case that the data frame of minimum length exists in full on the FDDI ring.

Figure 1:
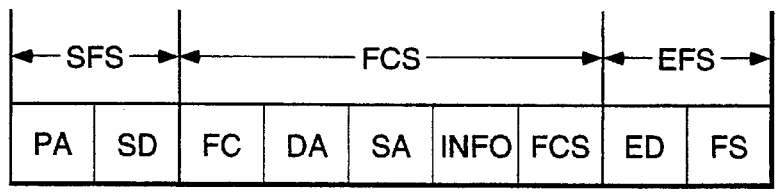
FIG. 1 is a diagram showing data form of FDDI protocol of general FDDI.
Figure 2:
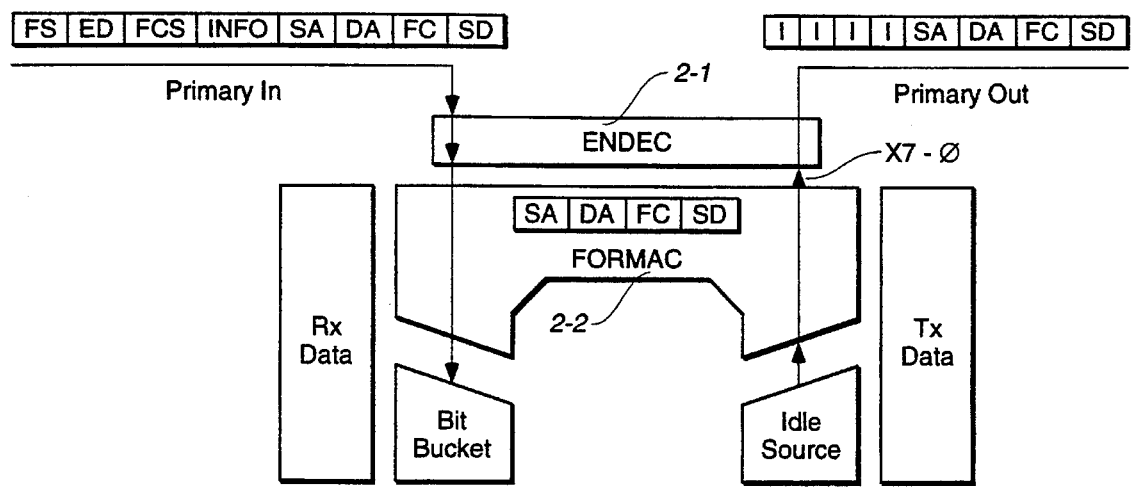
FIG. 2 is a diagram for explaining a frame stripping process transmitted to general FDDI ring.

The data frame of minimum length is as follows when assuming a case that each region is consisted on minimum symbol in FIG. 1.

Symbol of this frame
= PA + SD + FC + SA + INFO + FSC + ED + FS
= 16 + 2 + 2 + 12 + 12 + 0 + 8 + 1 + 3
= 56 [symbols]

In accordance with the X3T9.5 FDDI media access control standard, in order that a start delimiter SD goes round the FDDI ring, a time within maximum 2.661 msec by summing a logical ring latency of optical fiber and a logical ring latency by all stations connected to the FDDI ring should be required, and this is defined as maximum logical ring latency.

That is, D_Max(maximum logical ring latency) =2.661 [msec]
and a time required for transmitting the frame of maximum length, that is a maximum frame time, is defined as 0.361 msec.

The frame of maximum length becomes 9016 symbols added with the maximum length 9000 symbols of the frame and a preamble of 16 symbols.

That is, F_Max(maximum frame time) =0.361 [msec].

Accordingly, a data rate of FDDI MAC (MAC_DR) is obtained as 25000000 [symbols/sec] by computing as follows.

$$MAC\_DR = \frac{\text{length of maximum frame} + \text{preamble}}{F\_Max}$$

$$= \frac{9016}{0.361 \times 10^{-3}} = 25000000 \text{ [symbols/sec]}$$

Accordingly, when a time required for transmitting the frame of minimum length is assumed as F_Min(minimum frame time), the F_Min is computed as follows and 0.00208 msec is obtained.

$$F\_Min = \frac{\text{symbol numbers of minimum length frame}}{MAC\_DR}$$

$$= \frac{56}{25000000} = 0.00224 \text{ [msec]}$$

Accordingly, the numbers of the frames of the case that a shortest frame is filled to the FDDI ring made in maximum is obtained as 1188 by following computation.

$$\text{Maximum Frame Entry} = \frac{D\_Max}{F\_Min} = \frac{2.661}{0.00224} = 1188$$

consequently, five (1280 entries) of Am99C10 CAM (256 entries×48 bits) are used for registration of the source address for the frame of 1188.

Figure 5:
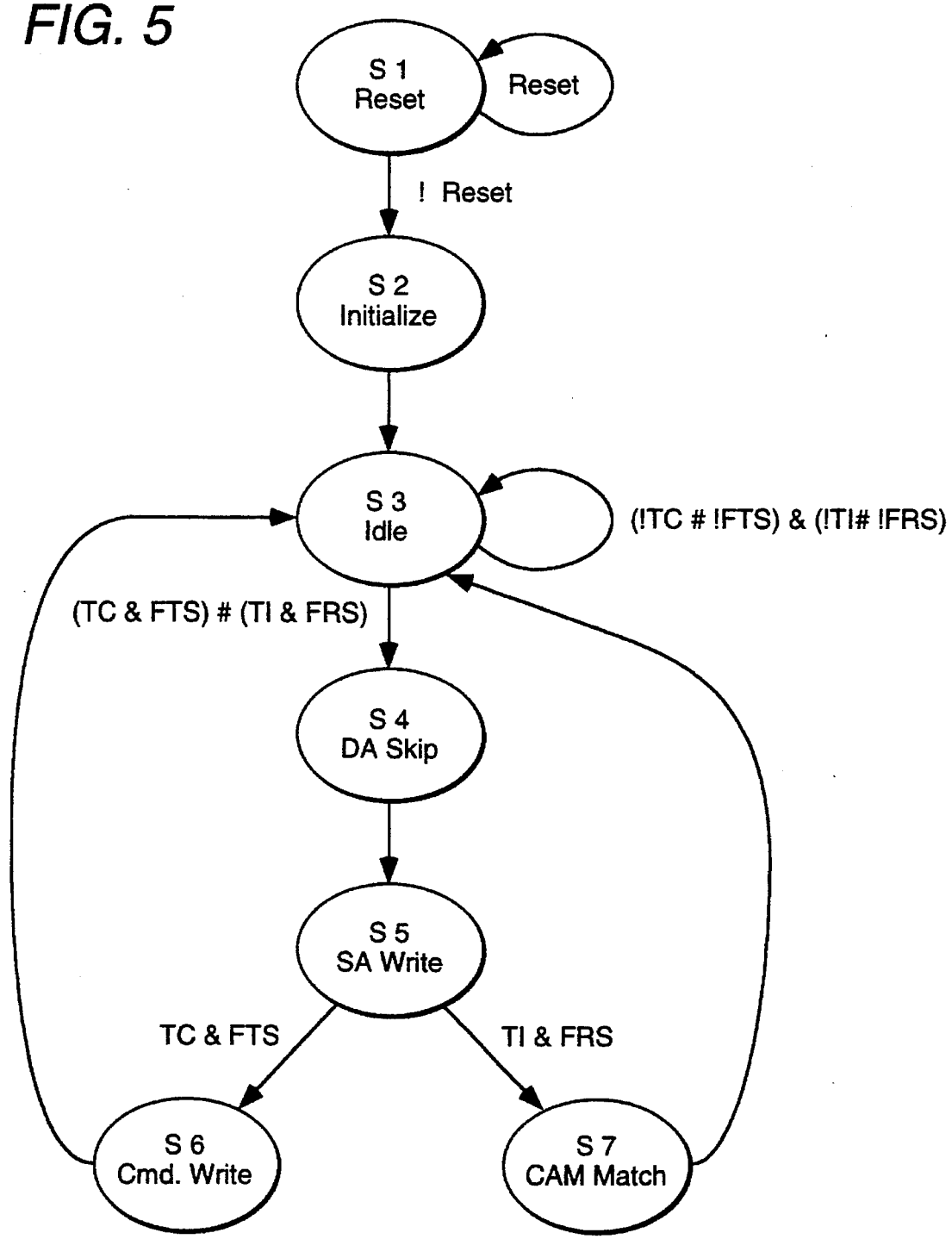
FIG. 5 is a transitional diagram of a state for explaining a frame stripping method in accordance with the present invention.

FIG. 5 shows a transitional diagram of a state explaining a frame stripping method in accordance with the present invention, and a process routine for each state S1–S7 will be described.

State S1 (S1 Reset):
It stays at S1 (reset) state during the Reset* signal of main board is low. At this moment, the circuit of the present invention does not any operation in a stop state.

When the Reset, signal becomes high, it moves to a state S2,

State S2 (S2 Initialize):
In the S2(Init) state, it commands and writes a value of 00XX to 16 bits data bus of CAM and initializes the CAM chip to operate in 48 bits mode.

After initializing, it moves to a state S3.

State S3 (S3 Idle):
In the S3 state(Idle), it either stays on the S3 state according to the states of the transmit status pins and the receive status pins of the FORMAC+ or moves to a state S4.

Figure 6:
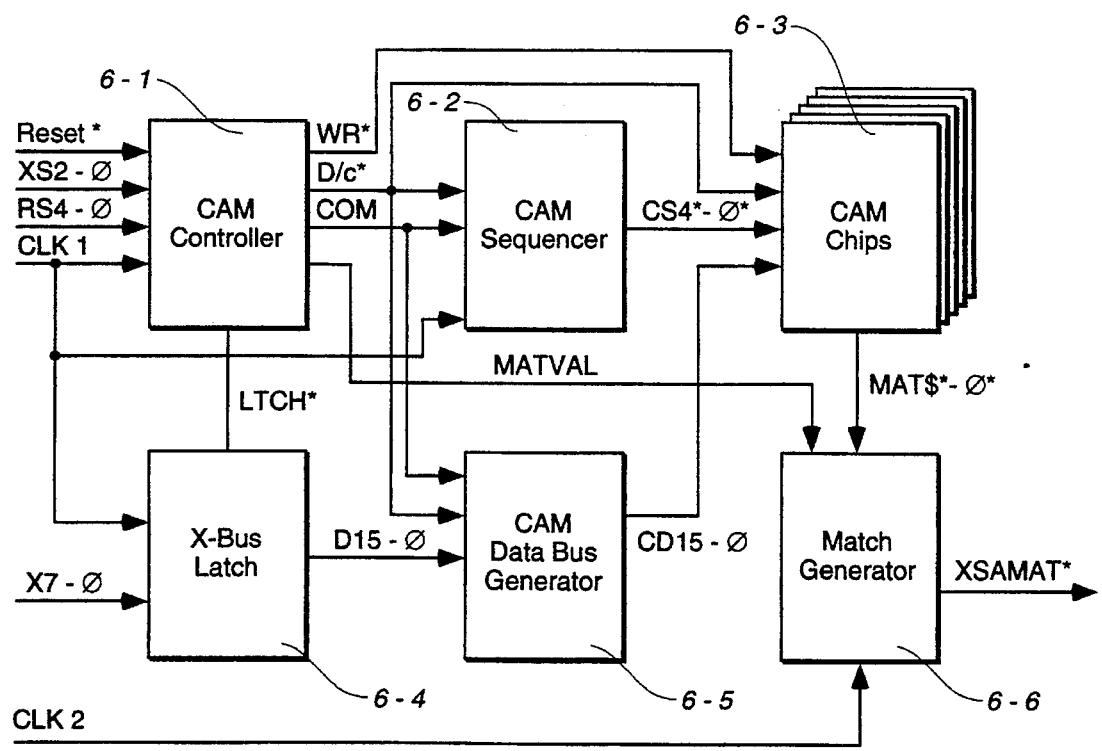
FIG. 6 is a block diagram of a frame stripping circuit in accordance with the present invention, FIG. 7 a timing diagram for the states S1,S2, and S3 in FIG. 5.

When a token is received at the FDDI ring, the token capture state is appeared, and this is stored to the CAM controller 6-1 shown in FIG. 6, and thereafter when the frame is transmitted from the FDDI bridge system to the FDDI ring, a frame transmitting state is appeared to the transmit status pins. And, the FORMAC+ indicates a token issued state to the transmit status pins at a time when finishing a frame transmission and,transmitting a token to the FDDI ring, this is also stored to the CAM controller 6-1 and thereafter when a frame enters from the FDDI ring, the FORMAC+ is shown with the frame receiving state at the receive statue pins.

The state is moved to a state S4 in case of above-described two kinds cases and in case when a condition is not satisfied, it stays to a state S3.

State S4 (S4 DA Skip):
In S4 state (DA Skip), SD (Starting Delimiter) during transmitting or re-transmitting is appeared at the transmit bus X7-0 of the FORMAC+ at a time point that the frame transmitting and frame receiving states are appeared at the transmit and receive status pins of the FORMAC+ regardless of either a state that the bridge system has caught a token and then transmits the frame or a state that the frame enters from the FDDI ring after executing a token command to the FDDI ring phase, and thereafter it utilizes a feature that DA (Destination Address) of 6 bytes appears by synchronizing to an operation clock (CLK1) of the FORMAC+ shown in FIG. 6, and executes an operation for skipping said FC,DA.

State S5 (SR SA Write):
In S5 State (SA Write), SA (Source Address) of the frame appearing to the transmit bus of the FORMAC+ is executed with a writing operation to a comparand register within the CAM chip. If in case of transmitting a frame to the FDDI ring, it moves to a state S6 after the comparand register writing, and if it is a case of receiving the frame, it moves to a state S7.

State S6 (ST Cmd. Write):
In S6 State (Cmd Write), an operation is executed which registers a source address of an already written frame to the comparand register within the CAM chip at the state S5 to a memory within the CAM chip. That is, a write command is executed to the CAM chip. (This write command does an operation for storing the source address of the frame being a 48 bits already written to the comparand register within the CAM chip in the state S5 to the memory within the CAM chip).

When the write command is ended, it moves to a state S3.
State S7 (S7 CAM Match):
In S7 State (CAM Match), the source address already written to the comparand register within the CAM chip in the state S5 and the source addresses already registered to the memory within the CAM chip in the state S6 upon transmitting the frame are compared each other.

That is, it is a process for checking whether or not the source register residing in the comparand register at present resides to a memory within the CAM chip.

If the source address contained within the comparand register resides to the memory within the CAM chip, the match generator 6—6 on FIG. 6 outputs XSAMAT* signal in low to the FORMAC+ whereby makes to strip the frame presently re-transmitting, and it moves to a state S3.

When the source address matching is not generated, it moves to a state S3 with keeping the XSAMAT* signal to high.

The FORMAC+ inputted with the XSAMAT* signal to low inserts the idle symbols to the INFO region of the frame being presently re-transmitted whereby executes the frame stripping.

A frame stripping circuit block diagram of the present invention is shown in FIG. 6, and an explanation for its function and signal is as follows.

The CAM controller 6-1 is a major block for executing the frame stripping operation of the present invention, and when the Reset* signal is inputted in low from the main board, it stops the frame stripping operation, and when the Reset, signal is inputted in high, it initializes (State S2) the CAM chip for executing the frame stripping.

And, it controls the operation of other circuit blocks 6-2,6-3,6-4,6-5,6—6 by synchronizing to the operating clock CLK1 of the FORMAC+ in accordance with the receive status pins RS4-0 and the transmit status pins XS2-0 of the FORMAC+.

A WR* signal operates as a write signal of the CAM chip, and the D/C* signal operates as a data/command signal of the CAM chip.

That is, when the D/C* signal is high, it operates as data, and when it is low, it operates as command.

A MATVAL* signal makes a timing of the XSAMAT* signal of the match generator 6—6 to be controlled.

A COM signal couples with the D/C* and controls the operation of the CAM sequence 6-2 and the CAM data bus generator 6-5.

That is, when a combination of the D/C* and the COM signals are low and high, an initialization executing state S2 of the circuit of the invention is appeared, and when the combination is high and low, an idle state (S3 state) or DA skip state (S4 state) are appeared, and when the combination is high and high, it shows the SA write state (S5 state) for writing a source address to the comparand register of interior of the CAM chip or else the CAM match state (S7 state) for checking whether or not the MAT*-0* signal is appeared from the CAM chip.

If the combination is low and high, it shows a command write state (S6 state) which is a state for registering the source address already registered to the comparand register within the CAM in the state S5 to the memory within the CAM chip.

The CAM sequencer 6-2 is a block for receiving a signals of D/C* and COM from the CAM controller 6-1 and synchronizing to the clock CL1 whereby outputting a chip selecting signal of five CAM chips according to the state.

In the initialization executing state (S2 state), five CAM chips selecting signals are all outputted whereby all of the five CAM chips are made to be simultaneously initialized.

In the SA write state (S5 state) also, five CAM chips selecting signals are all made to low whereby the source address is recorded to the comparand register within all CAM chips and thereafter, when the continuing state is a CAM match state (S7 state), the five CAM chips selecting signals are all maintained to low whereby it makes to execute a comparison of all of the memories within five CAM chips with the source address contained within the comparand register at present.

When a state continuing to the SA write state (S5 state) is a command write state (S6 state), only one of the five CAM chips selecting signals is continuously maintained to low, and remaining four CAM chips selecting signals are outputted to high whereby the source address is made to be registered to only one memory within the CAM chip.

At this moment, since the source address value already stored to the comparand register within the practical CAM chip is not registered to the memory within the CAM chip and thereafter it is overridden at a time when a new source address is written to the comparand register of the CAM chip, the remaining four CAM chips that the CAM chip selecting signal is changed to high does not make any problem entirely.

In this case, the CAM chip 6-3 consists of five of Am9910 chip of AMD company, and which is inputted with WR*, D/C*, CA4*-0* and CD15-0 and registers the source address of the frame transmitted from the FDDI bridge system to the memory within the CAM chip, and when the source address of the inputting frame is compared with the source address within the memory already stored upon transmitting the frame and an identical source address is found out, a MAT4*-0* signal is outputted to the match generator 6—6 as a low signal of more than one.

And, in the present invention, since entire memories within the five CAM chips are constituted by one ring buffer, in case when the numbers of the frames transmitting after catching the token exceeds 1280, it becomes to be returned to the start and to be overridden.

Therefore, in the FDDI bridge system, the frame transmission is ended and the token command is executed, and the circuit of the present invention can store the source addresses of maximum 1280.

This is so carried out that, as described before, in the FDDI bridge system, since maximum numbers of the frames existing on the FDDI phase at a moment executing the token command is 1188, the entries of 1280 can be contained by using five CAM chips, therefore the frame transmitted by oneself can be all stripped on the FDDI ring phase.

Figure 3:
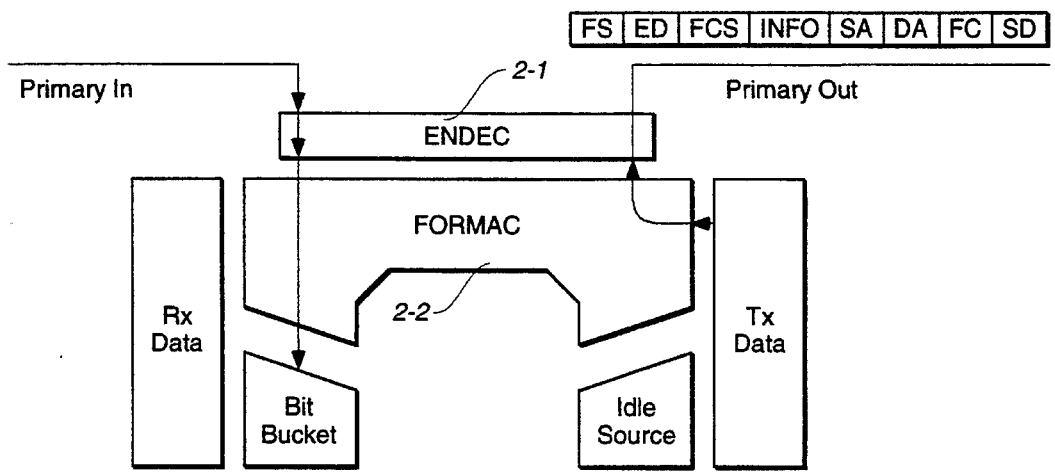
FIG. 3 is a diagram for explaining a frame stripping process entering during a frame transmitting process of general FDDI ring.
Figure 4:
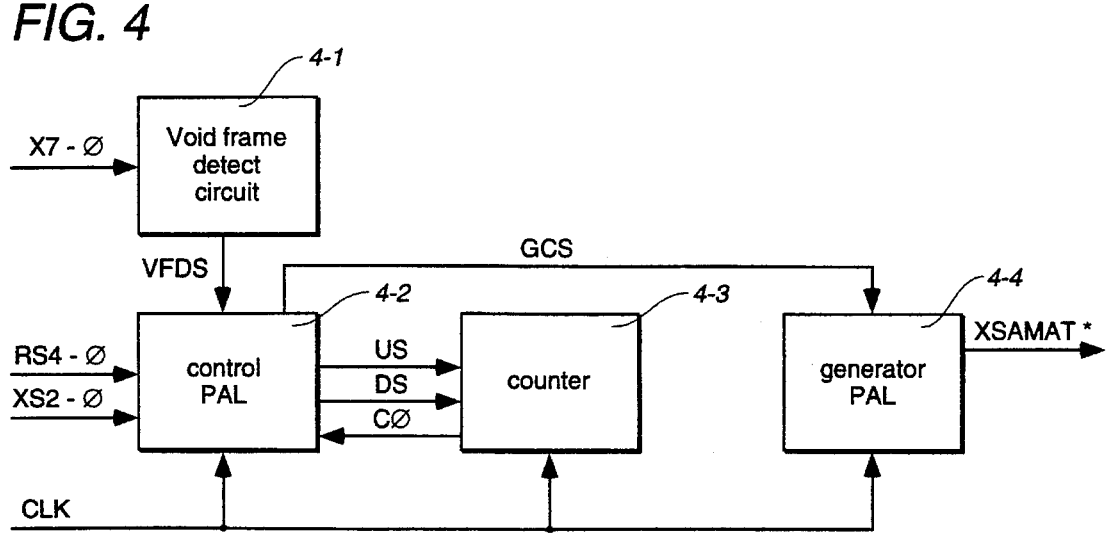
FIG. 4 is a block diagram of a conventional frame stripping circuit.

For instance, in case when 2000 frames of minimum length are transmitted, 812 frames have entered to the primary in of the FDDI bridge system before executing the token command, and it is a state that the FORMAC+ has stropped as FIG. 3.

And, since the memory within the CAM chip consists of ring buffer, the source addresses of the 1280 frames transmitted immediately before the FDDI bridge system transmits the token are stored, therefore the source addresses for the 1180 frames existing on the FDDI ring phase at a time point transmitted the token are all contained.

And, the bus latch 6-4 is inputted with LTCH* signal, i.e., the transmitting bus latch signal and the clock CLK1 outputting from the CAM controller 6-1, and latches the source address of the frame during transmitting or re-transmitting at the transmitting bus X7-0 of the FORMAC+, and serves a role for transferring this to the CAM data bus generator 6-5.

That is, the source address during transmitting by 8 bits unit is latched two times and made to 16 bits and thereafter transferred to the CAM data bus generator 6-5.

And, the CAM data bus generator 6-5 is inputted with the D/C* and COM signals from the CAM controller 6-1, and does a role of bypass which either generates and outputs CD15-0 entering to the data bus of the CAM chip at oneself according to its state, or outputs the input of D15-0 to CD15-0 as it is.

That is, in case when the combination of D/C* and COM is an initialization executing state (S2 state), CD15-0 is outputted to 00XX (which is expressed to hexadecimal notation and X is a condition having no relation) and becomes to initializ five CAM chips to be operated simultaneously to 48 bits mode, and when the combination of D/C* and COM is the command write state (S6 state), it outputs EOAA (which is a hexadecimal notation and AA is an output of the 8 bits controller residing within the CAM data generator block, which stores the address of memory within the CAM chip to be stored with the source address contained in the comparand register within the CAM chip, and E0 is a command to make the contents of the comparand register to be stored to the memory within the CAM chip) to CD15-0.

In case when the combination of the D/C* and COM is the SA write state (S5 state), it outputs from X_bus latch 6-4 to D15- and makes to write to the comparand register of the CAM chip.

And, the match generator 6—6 outputs the XSAMAT* signal to low when a signal more than one of the MAT4*-0 signal is inputted to low, and this makes to enter the XSAMAT* input pins of the FORMAC+ and strip the frame during the FORMAC* being re-transmitting at present.

The clock CLK2 is a signal for matching the timing that the XSAMAT* input pins of the FORMAC+ demand.

It will be described in relation to the timing diagram of the signal accordance with the aforementioned state transitional diagram of the present invention.

Figure 7:
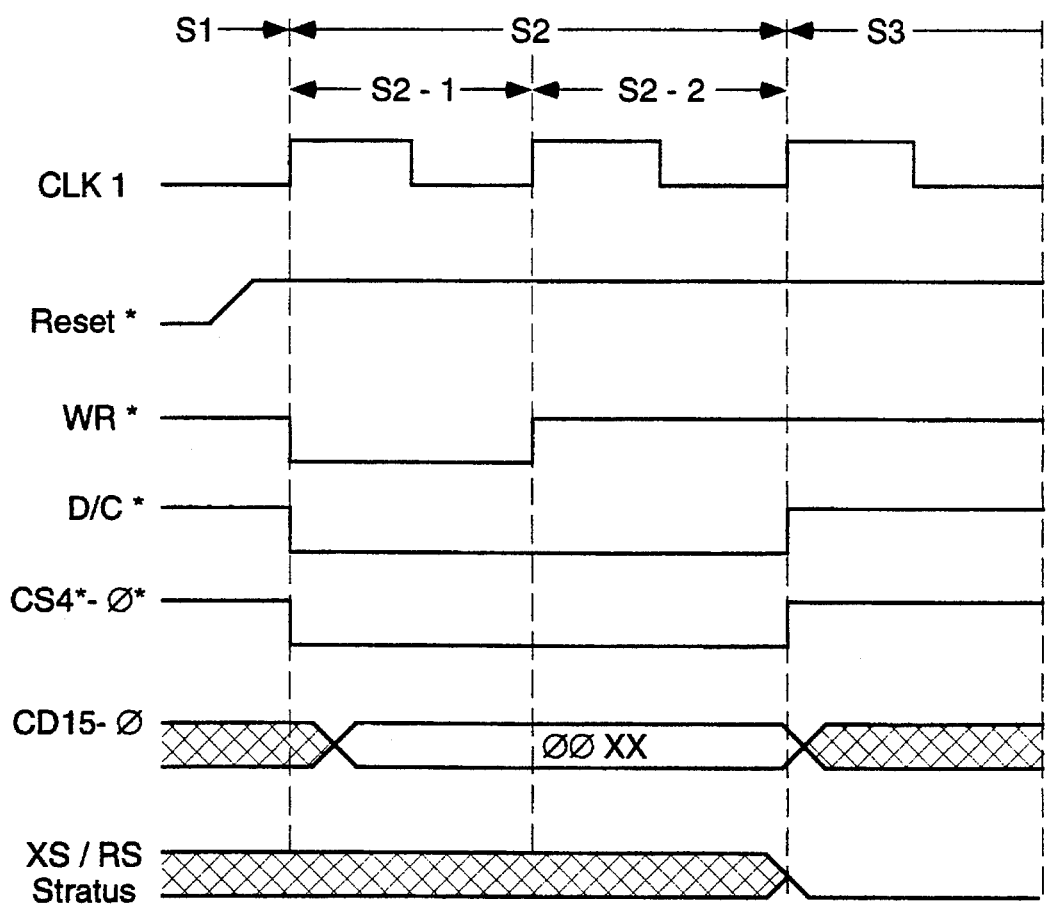

The timing diagram for the states S1,S2,S3 is as same as shown in FIG. 7, and since the reset signal Reset* is maintained to low in S1, it moves to S2 state as the reset signal Reset* is changed to high while it is not doing any operation. S2 state consists of S2-1 and S2-2 and its operation is as follows.

The CAM controller 6-1 recognizes that the reset signal Reset* is changed to highland moves to S2 state and drives the WR*, D/C* and CD4*-0, at this moment, the CAM data bus generator 6-5 drives 00XX (which is hexadecimal notation, and XX is a condition having no relation) to the CD15-0* whereby initializes the CAM chip 6-3 to be operated to 48 bits mode.

When the initialization of the CAM chip is ended, immediately moves to S3 state and waits a state that the token capture or token command executing state is appeared to the receive status pins and the transmit status pins.

Figure 8:
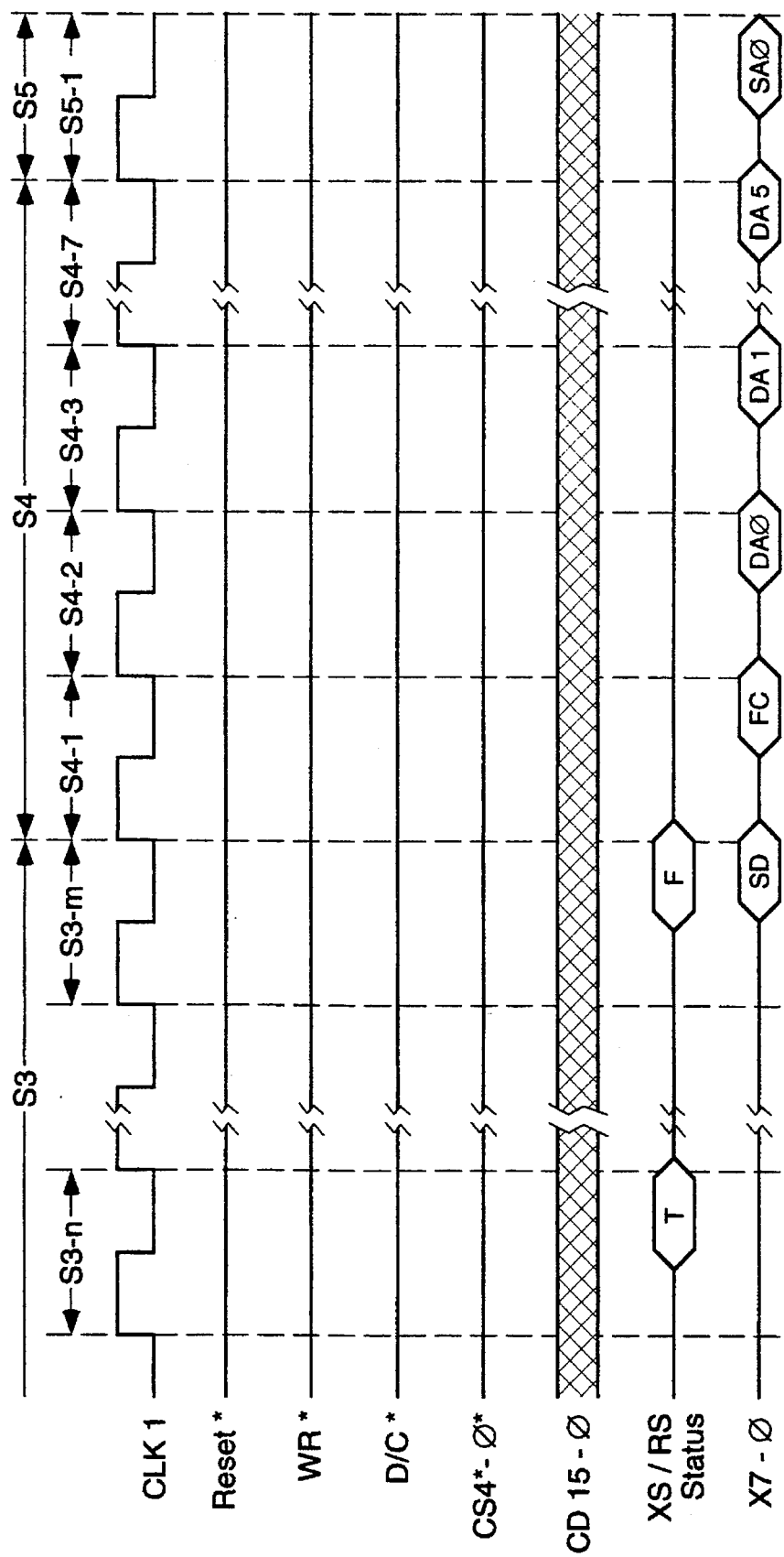
FIG. 8 is a timing diagram for the states S3,S4 in FIG. 5.

The timing diagram for S3 and S4 is as shown in FIG. 8, and when the token capture state is appeared (S3-n state) to the receive status pins in S3 state, this is a case that the token is captured at the FDDI ring, and thereafter the frame can be transmitted from the FDDI bridge system, and the frame transmit status (S3-n state) is appeared to the transmit status pins in case of transmitting the frame.

In S3-n state, the starting delimiter of the frame is appeared during transmitting to the transmit bus. Thereafter, the CAM controller 6-1 executes the S4 state for skipping the station address and the frame control of the frame during transmitting.

And, in S3 state, when a token command executing state (S3-n state) is appeared to the transmit status pins, this is a case that the FDDI bridge system ended the frame transmission transmits the token to the FDDI ring phase, and thereafter when the frame receive status is appeared to the receive status pins, this is a case that already transmitted fram goes round the FDDI ring and returns back.

In this case, the frame is re-transmitted again to the FDDI ring through the tramsmitting bus of the FORMAC+, and since a starting delimiter of the re-transmitted frame is appeared to the transmitting bus at a time of S3-n state, the frame control and the destination address of the frame skipped in S4 state.

Consequently, in S3 state, the CAM controller 6-1 recognizes the token capture, the token command execution, and the frame transmitting state, and ensures the frame receiving state etc., and thereafter in S5 state, a base capable of dividing to S6 or S7 state, and executes S4 state for skipping the frame control and destination address of the frame on the transmitting bus by utilizing a characteristic of the transmitting bus equally operating regardless of the frame transmit or receive status.

At this time, the signal controlling the CAM chip 6-3 does not operate in all.

Figure 9:
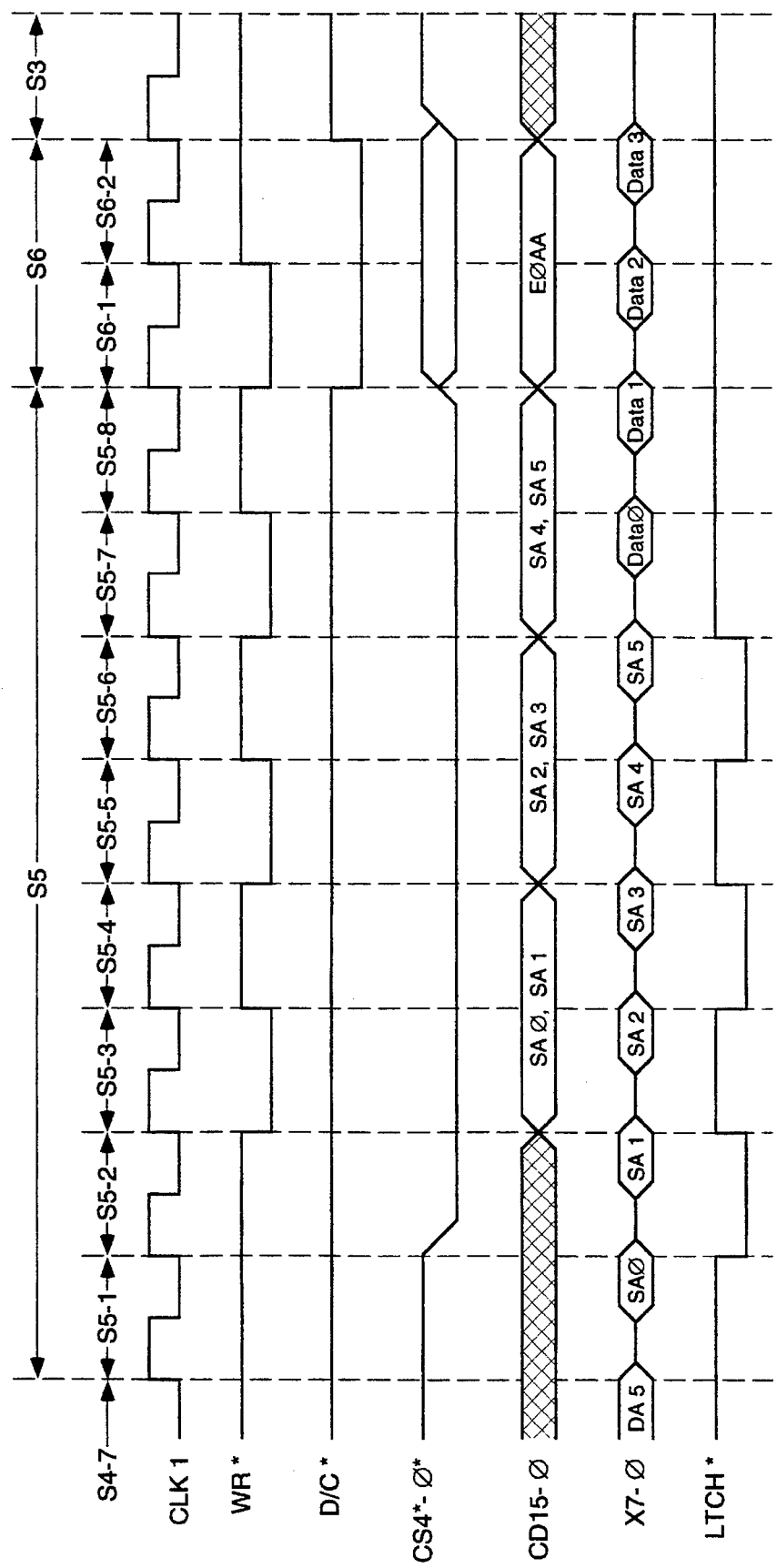
FIG. 9 is a timing diagram for the states S5,S6 in FIG. 5.

Thereafter, the source address of the frame is appeared to the transmitting bus, and S5 state for writing this to the comparand register of the CAM chip 6-3 and S6 state in which the FDDI bridge system moves upon transmitting the frame are shown in FIG. 9.

In S6 state, an operation for storing the source address written to the comparand register within the CAM chip in S5 state to the memory of the CAM interior is executed.

In S5-1 state, the address of 8 bits of total 48 bits source address are appeared to the transmitting bus, and in S5-2 state also, (SA0, SA1) (SA2, SA3) (SA4, SA5) are latched with matching to the latch signal LTCH* transmitting from the CAM controller 6-1 and the source address of 16 bits is transferred to the CAM data bus generator 6-5 through the D51-0 line, and the CAM data bus generator 6-5 drives this CD15-0 to the data bus of the CAM chip.

That is, SA0 and SA1 are added to the data bus of the five CAM chips and driven to S5-3 and S5-4 states, SA2 and SA3 are added and driven to S5—5 and S5-6 states, and SA4 and SA5 are added and driver to S5-7 and S5-8 states, respectively. The CAM sequencer 6-2 drives the CS4*-0 all to low during S5-8 and enables the chip selecting signal of the five CAM chips.

And, the CAM controller 6-1 drives the WR* signal to low in S5-3, S5—5, S5-7 states and writes the source addresses of total 48 bits appeared to the transmitting bus to the comparand register within the five CAM chips.

The case of FIG. 9 shows a case upon transmitting the frame as an example, and at this time it is moved from S5 state to S6 state, and the CAM controller 6-1 drives D/C* signal to low during S6 state and operates the CAM chip 6-3 to the command mode, and the CAM data bus generator 6-5 outputs the EOAA (which is a hexadecimal notation, and E0 is a command to the CAM chip to register the source address value of 48 bits written to the comparand register at S5 state to the memory within the CAM chip, and AA is a value of 0–225 range used for designating an address of memory within the CAM chip, and this is generated by the data bus generator) to the CDI5-0.

And, the CAM controller 6-1 has driven five signals of the CS4*-0 to all low in S5 state, but in S6 state, only one CS signal of five is driven to low so as to make the source address to be registered to only one CAM chip.

Thereafter, when it is moved to S3, the operation is executed as followings in accordance with the states of the transmit status pins and the receive status pins.

As shown in FIG. 5, when a frame receive status is sensed at the token command execution receiving status pins from the transmit status pins at S3 state, S4 state and S5 state are executed and it is moved to S7 state.

Figure 10:
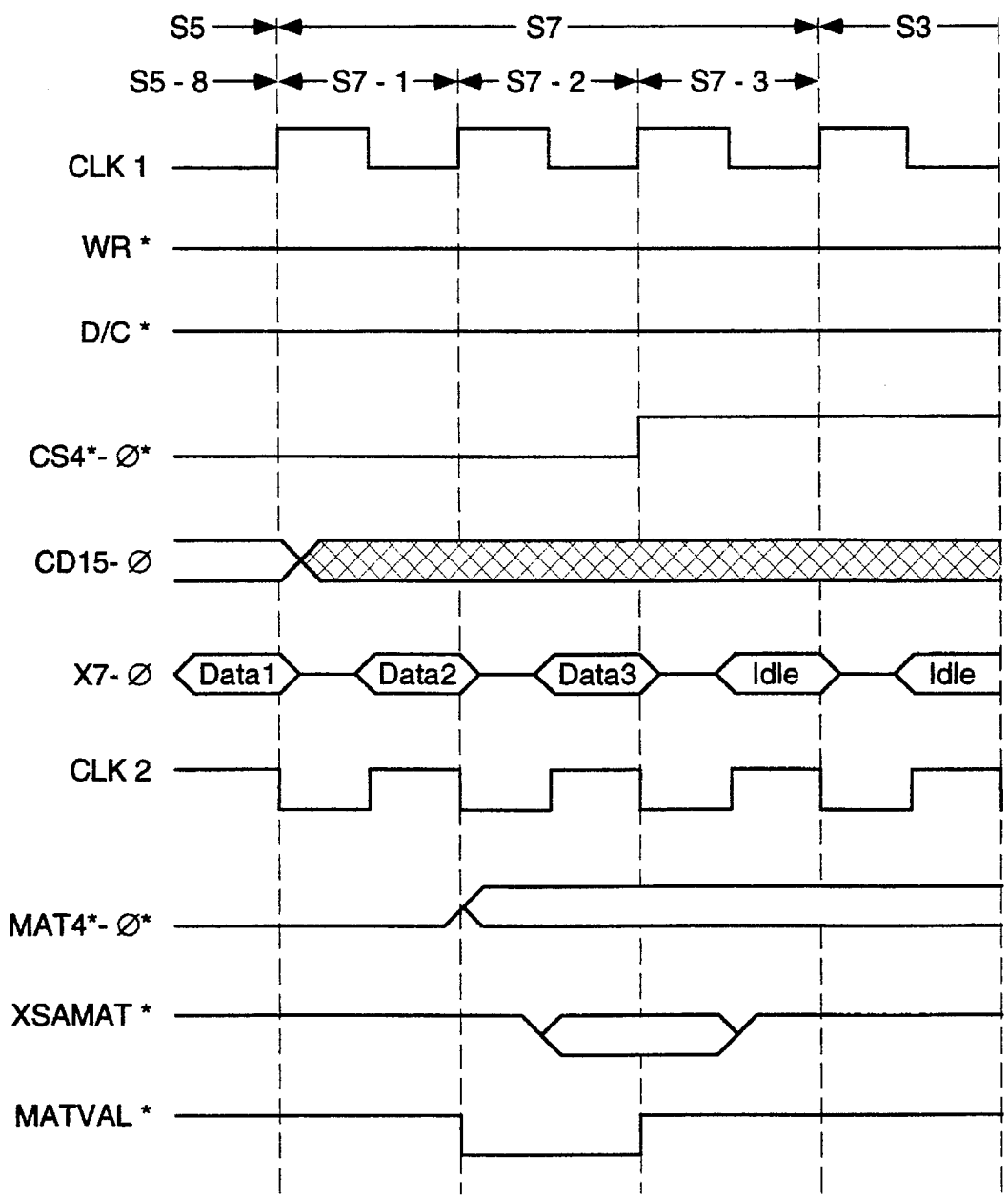
FIG. 10 is a timing diagram for the state S7 in FIG. 5.

A timing diagram for S7 state is as shown in FIG. 10, and the S7 state is a process for executing a comparison of the source address written to the comparand register of five CAM chips with the source address already registered into the memory of the CAM chip in S5 state, and the CAM sequencer 6-2 maintains the CS4*-0* signal to low during the S7-1 and S7-2 states, and maintains the chip selecting signal of the CAM chip 6-3 consisting of five CAM chips as it is, and the CAM controller 6-1 outputs the WR* and D/C* signals to high.

If a case of the source address match is occurred, the CAM chip 6-3 outputs more than one of MAT4*-0 signals from the S7-2 state, and the match generator 6—6 outputs the XSAMAT, signal to the FORMAC+ by synchronizing a MATVAL* signal that the MAT4*-0 signal and the CAM controller 6-1 outputs to low to the S7-2 state to a rising edge of the clock CLK2, and if the XSAMAT* signal is low, the FORMAC+ inserts an idle symbol to INFO field of the frame during re-transmitting at present whereby strips the frame on the FDDI ring.

That is, when synthetically explaining the operation of the present invention, the frame returning during the FDDI bridge system transmits the frame, is automatically stripped by the FORMAC+, and in a stripping of the frame remaining on the FDDI ring upon transmitting a token after transmitting the frame, while the source address of the frame is stored to the memory upon transmitting the frame, the source address of the frame entering after transmitting the token is compared with the source address registered to the memory and thereafter, when the XSAMAT* signal of the FORMAC+ is applied to low only when it is judged that same address is present, the FORMAC+ absorbs INFO region of the frame in order to strip the frame during re-transmitting at present from the FDDI ring, and inserts the idle symbol to the INFO region instead of that whereby strips the frame already transmitted by oneself by re-transmitting to the FDDI ring.

As a memory for storing the source address upon transmitting the frame, Am99C10 (CAM: Content Addressable Memory) chip of AND shape is used, and the Am99C10 chip consists of 256 words×48 bits and it has a facility outputting the match signal (MTCH*) when the inputting 48 bits word has same word with 256 words one cycle.

As described above, in accordance with the present invention, the source address is registered to the CAM chip upon transmitting the frame in the FDDI bridge system, and the source address of the frame returning after executing the token command is compared with the source addresses within the already registered CAM chip and yes or no of the source address matching is judged, so that the frame stripping can be effectively executed than the existing method, and since a comparand routine with the source address registration is surely discriminated, a stabilization of the system operation can be schemed.

What is claimed is :

1. A frame stripping circuit in an FDDI bridge system comprising:

a content addressable memory controller means for registering a system operation, said content addressable memory means being synchronized to an operating clock of a FORMAC+, said content addressable memory controller means for producing a first output;

a content addressable memory sequencer means for generating a chip selecting signal, said content addressable memory sequencer means having a second output for selecting one of a plurality of content addressable memory chips connected thereto;

said plurality of content addressable memory chips connected to the first output of said content addressable memory controller means and connected to the second output of said content addressable memory sequencer means, said plurality of content addressable memory chips arranged to register a source address of a frame transmitted from the FDDI bridge system in a memory within one of said content addressable memory chips, said plurality of content addressable memory chips for comparing the source address of a received frame with the registered source address, said plurality of content addressable memory chips producing an output signal when a matched source address is present;

an X bus latch means for latching a source address of the frame to a transmitting bus of said plurality of content addressable memory chips, said X bus latch means for generating a third output, said plurality of content addressable memory chips connected to said third output; and a match generator means connected to said plurality of content addressable memory chips so as to receive the output signal from said chips, said match generator means for generating an external source address matching signal to the FORMAC+ so as to cause the frame to be stripped.

* * * * *